United States Patent
Armbruster

(10) Patent No.: US 9,931,772 B2
(45) Date of Patent: Apr. 3, 2018

(54) INJECTION MOULDING DEVICE

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 188 days.

(21) Appl. No.: 14/895,673

(22) PCT Filed: Jun. 2, 2014

(86) PCT No.: PCT/EP2014/061365
§ 371 (c)(1),
(2) Date: Dec. 3, 2015

(87) PCT Pub. No.: WO2014/195263
PCT Pub. Date: Dec. 11, 2014

(65) Prior Publication Data
US 2016/0121529 A1 May 5, 2016

(30) Foreign Application Priority Data

Jun. 6, 2013 (CH) ...................................... 1074/13

(51) Int. Cl.
*B29C 45/16* (2006.01)
*B29C 45/26* (2006.01)

(52) U.S. Cl.
CPC ........ *B29C 45/162* (2013.01); *B29C 45/2606* (2013.01); *B29C 2045/1617* (2013.01)

(58) Field of Classification Search
CPC .............. B29C 45/162; B29C 45/2606; B29C 2045/1617
See application file for complete search history.

(56) References Cited

U.S. PATENT DOCUMENTS

| 3,820,930 A | 6/1974 | Hehl |
| 7,871,260 B2 * | 1/2011 | Boucherie ............. B29C 45/045 425/548 |
| 2010/0276836 A1 * | 11/2010 | Armbruster ........... B29C 45/045 264/255 |

FOREIGN PATENT DOCUMENTS

| DE | 101 21 691 A1 | 11/2002 |
| EP | 0 058 947 A1 | 9/1982 |
| EP | 0 070 189 A1 | 1/1983 |
| EP | 1 174 242 A2 | 1/2002 |
| EP | 1 782 936 A2 | 5/2007 |
| JP | 2006 035667 A | 2/2006 |

(Continued)

*Primary Examiner* — Robert B Davis
(74) *Attorney, Agent, or Firm* — Pauley Erickson & Kottis

(57) ABSTRACT

An injection molding device includes a first mold half and a second mold half, which is arranged so that the second mold half can be moved linearly in in relation to the first mold half. A third mold half, arranged between the first and the second mold halves, interacts with the first mold half in a first parting plane to form first cavities and interacts with the second mold half in a second parting plane to form second cavities. The third mold half includes an upper part and a lower part, spaced apart by a slot. A first drive shaft is arranged in an interior of the third mold half. The first drive shaft includes at least one carrier arranged on an arm so that the carrier is movable in a radial direction. The first drive shaft is supported with respect to both the upper part and the lower part by at least one bearing.

10 Claims, 2 Drawing Sheets

(56) References Cited

FOREIGN PATENT DOCUMENTS

| WO | WO 2006018364 A1 * | 2/2006 | ......... B29C 33/0083 |
|----|----|----|----|
| WO | WO 2007/082394 A1 | 7/2007 | |
| WO | WO 2007/085063 A1 | 8/2007 | |
| WO | WO 2013/001022 A1 | 1/2013 | |

* cited by examiner

INJECTION MOULDING DEVICE

BACKGROUND OF THE INVENTION

Field of the Invention

The present invention relates to the area of injection molding devices, in particular injection molding devices for the injection molding of plastics.

Discussion of Related Art

From the prior art, injection molding devices are known which have a first mold half and a second mold half that can be linearly displaced in relation to the first mold half. Between the first and second mold halves, a third central mold half (central part) is attached, which is also disposed so as to be linearly displaceable in the same direction in relation to the first and second mold halves. A coordination mechanism ensures that the third, central mold half, during the opening and closing of the injection molding device, is positioned centrally between the first and second mold halves and is moved in a manner coordinated with these.

The first and third mold halves interact in the region of a first parting plane and the second and third mold halves in the region of a second parting plane (also referred to as parting plane) in order to form cavities, into which e.g. molten plastic for producing injection molding parts is injected. As a rule, a plurality of cavities exists for each parting plane in order to enhance efficiency.

Further, a transfer system exists, by means of which injection-molded parts produced in the first parting plane can be lifted out of their cavities when the injection molding device is open and can be introduced around the central mold half into the second parting plane and there into cavities of the second parting plane.

From the prior art, various such devices are known. These will be briefly explained below.

EP0070189 was published in 1984 in the name of Sumitomo Heavy Industries and relates to an injection blow molding device with a non-rotatably mounted central part. A transfer system is rotatably mounted at the bottom and at the top on the central part. It is used for moving parts produced by injection molding in a first parting plane into a second parting plane, where they are molded by blow molding. The transfer system is part of the injection molding device and remains, during the production of the parts, inside the injection molding device when the latter is closed.

EP1174242 was published in 2002 in the name of the Co. Hekuma GmbH and shows an injection molding device of the kind mentioned at the beginning with an externally mounted transfer device, which moves from the outside in between the two parting planes.

DE10121691 was published in 2002 under the name of the Co. Zahoransky Formenbau GmbH. Described is an injection molding device of the kind mentioned at the beginning. The transfer system is based on a chain drive having two chains, which is arranged around the central mold half, which chains run around two rotary axes and move the parts parallel to the lateral surfaces of the central mold half, which comprise the two cavity halves. The chains are arranged in two slots arranged in parallel. During transfer, the produced parts constantly adhere to a movable region of the cavities that is fixed to a lifting system.

EP1782936 was published in May 2007 in the name of the Co. Wilden Handels AG. The document describes an injection molding device of the kind mentioned at the beginning. The central mold half consists of a bottom part and a top part, which are separated from each other by a slot. In this slot, a transfer system is arranged that is used for transferring the parts from a first into a second parting plane. The transfer system rotates about a single axis. No details are known with regard to the construction of the injection.

WO07082394 was published in July 2007 in the name of the Co. Foboha GmbH Formenbau. This publication also describes an injection molding device of the kind mentioned at the beginning with a central mold half and a transfer system integrated in the mold. The central mold half has a bottom part and a top part, which are separated from each other by a slot. The transfer system rotates about a centrally positioned rotary axis. Regions of the cavities are fixed to radially adjustable cantilever arms located in the slot between the bottom part and the top part.

WO07085063 was published in August 2007 in the name of the Co. Boucherie NV G B. This document, too, is directed to an injection molding device of the kind described at the beginning. The device described in this publication is very similar in its construction of the transfer system to the one of EP0070189. Both include a transfer system that is rotatably fixed to the central mold half at the bottom and at the top.

SUMMARY OF THE INVENTION

The devices known from the prior art often have problems in connection with carrying media (air, water, hydraulic oil, data) from and to the central mold half and with regard to the flexibility of the rotary system. Further, the devices known from the prior art have a complex design that counteracts economic efficiency in particular during maintenance works.

It is an object of the invention to provide an injection molding device of the kind mentioned at the beginning, which allows a particularly simple and space-saving design and allows the number of cavities to be maximized.

This object is achieved by means of the fact that, contrary to the prior art, the bottom part and the top part of the central mold half are, as will be explained below, only partially operatively connected to each other.

As a rule, an injection molding device according to the invention includes a first mold half and a second mold half that can be linearly displaced in relation to the first mold half. If required, the first and/or the second mold half can be horizontally or vertically rotated about a further axis. For example, one mold half may be a rotary plate or a prismatic mold carrier with cavities on several lateral surfaces, which is e.g. arranged so as to be rotatable about a vertical axis Between the first and second mold halves, a third central mold half (central part) is arranged. The three mold halves are arranged so as to be linearly displaceable relative to each other in a first direction. One of the three mold halves may be arranged to be stationary. A coordination mechanism can ensure that the third central mold half is, during opening and closing of the injection molding device, centrally arranged between the first and second mold halves.

The first and third mold halves have first and second cavity halves, which interact in the region of a first parting plane in order to form first cavities in the closing position of the injection molding device. The second and third mold halves have third and fourth mold halves that interact in the region of a second parting plane in order to form second cavities in the closing position of the injection molding device. As a rule, a plurality of cavities exists for each parting plane for enhancing efficiency. The cavity halves are as a rule designed in multiple pieces. As a rule, for each cavity at least one region of one part forming the cavity is movably arranged on a transfer system. These carriers are serve for transporting parts produced in the first parting plane into cavities of the second parting plane.

The transfer system is integrated in the central mold half. By means of the carriers, e.g. injection-molded parts produced in the first parting plane are lifted out of the first cavities when the injection molding device is open, are pivoted about the central mold half and are then introduced into second cavities in the region of the second parting plane, where they are subjected to a further processing step. The transfer system has radially adjustable arms that are rotatable about a vertical axis, to which the carriers are peripherally fastened.

The central mold half has a multi-piece design with a top part and a bottom part, which in the embodiment described do not have a rigid connection to each other. The top part and the bottom part are separated from each other by a slot. In this slot, the radially adjustable arms of the transfer system are arranged so as to be rotatable about a first drive shaft. The first drive shaft is, in a top view, advantageously located approximately in the center of the central mold half. It is mounted both in the top part and in the bottom part by means of bearings in a radial and an axial direction and constitutes, together with the bearings, a mechanical connection between the top part and the bottom part, which transfers mechanical forces and positions the top part relative to the bottom part.

If required, the shaft may be designed to be hollow inside and can surround a further element, e.g. a second drive shaft, which is arranged coaxially relative to the first drive shaft and is used for driving the arms that are adjustable in the axial direction.

The rod may again be designed to be hollow and may be used for transferring media of the kind mentioned at the beginning. One advantage consists in the fact that only a minimum of non-rotatable parts is necessary and the design of the central mold half can be considerably simplified compared to the prior art.

In one embodiment, the invention relates to an injection molding device (injection molding tool), having a first and a second mold half, that is arranged so as to be linearly displaceable in a first direction relative to the first mold half. A third mold half is arranged between the first and the second mold half. The third mold half interacts with the first mold half in the region of a first parting plane in order to form first cavities and with the second mold half in the region of a second parting plane in order to form second cavities. The third mold half has a top part and a bottom part, which are spaced apart from each other by a circumferential slot. A first drive shaft is arranged inside of the third mold half. It has arranged thereon at least one carrier for an injection-molded part so that it can be adjusted via an arm in the radial direction. The at least one arm is provided in the slot. The at least one carrier is as a rule located outside of the slot and interacts with the cavities from the outside. As a rule, the carrier forms, in its closed position, part of a cavity. The first drive shaft is supported or mounted, respectively, by at least one bearing both relative to the top part and relative to the bottom part. It serves on the one hand for holding the at least one arm. On the other hand it is used for centering the bottom part relative to the top part. In this connection, the first drive shaft and the bearings form the only direct mechanical connection between the top part and the bottom part. The first drive shaft may be designed to be hollow like a tube. If needed, the second drive shaft may be provided on the inside, which serves for driving the arms or the carriers in a radial direction. If necessary, also the second drive shaft may be designed to be hollow. The first and/or second drive shaft may be used for transferring media such as cooling water, hydraulic oil, compressed air, information. The first drive shaft may be operatively connected to a first motor that is fixed to the top part. The second drive shaft may be operatively connected to a second motor that is provided in the region of an end of the first drive shaft. The top part may include first linear guides suitable for supporting the top part to the tie bars of an injection molding machine. The bottom part may include second linear guides that are suitable for supporting the bottom part on a machine bed and/or on the tie bars of an injection molding machine. At least one cavity in one of the two parting planes may include jaws that are displaceable in a lateral direction.

BRIEF DESCRIPTION OF THE DRAWINGS

Aspects of the invention will be explained in more detail by means of the embodiments shown in the figures below and the associated description, wherein:

FIG. 1 shows a central third mold half 1 of an injection molding device 2 according to the invention in a perspective view obliquely from above. FIG. 2 shows the third mold half 1 in a lateral view and FIG. 3 shows a sectional view along the sectional line AA according to FIG. 2.

DETAILED DESCRIPTION OF THE INVENTION

What is not shown are the first and second mold halves, which are also part of the injection molding device and are arranged, with reference to the x-direction (first direction), on opposite sides of the third mold half and are designed to be adjustable relative thereto in the first direction. The two mold halves (first and 10 second) that are arranged on the outside have a conventional construction and will therefore not be explained in detail. They interact with a first lateral surface 3 in the region of a first parting plane and with a second lateral surface 4 of the third mold half 1 in the region of a second parting plane.

The injection molding device 2 is provided for an operative connection with a commercially available injection molding machine. In this context, the first and second mold halves are fastened to the tool platens of the injection molding machine. The central third mold half is mounted on the machine bed and/or the tie bars of the injection molding machine (not shown in detail either).

Figure 1:
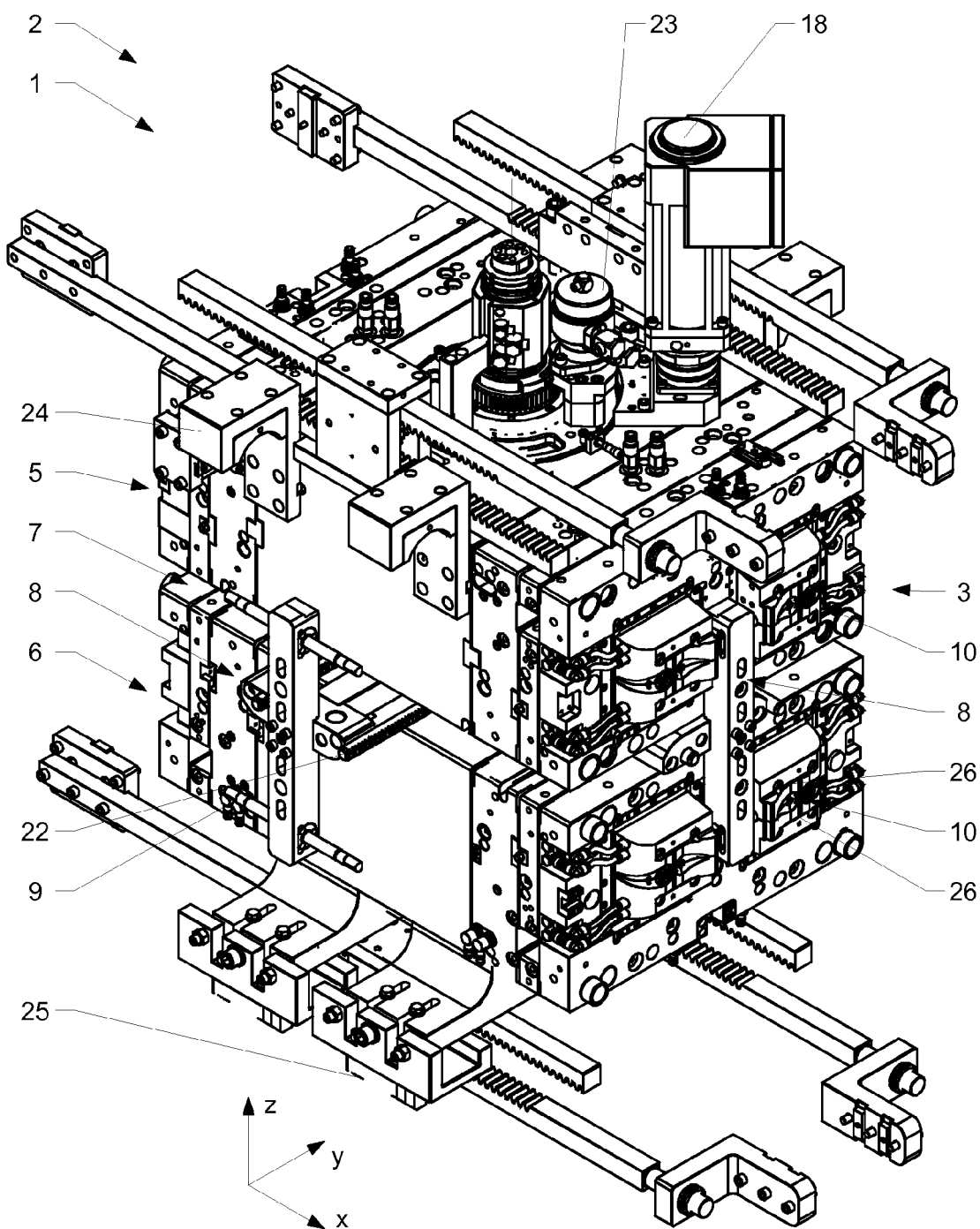
FIG. 1 shows an injection molding device in a perspective view obliquely from above.
Figure 2:
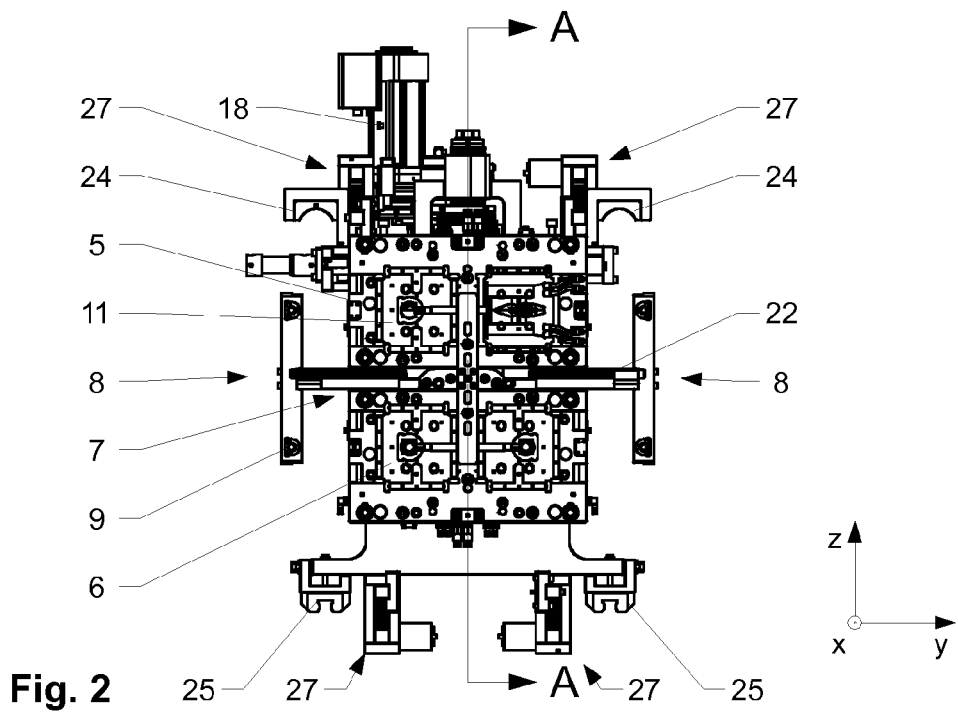
FIG. 2 shows the injection molding device according to FIG. 1 in a lateral view.
Figure 3:
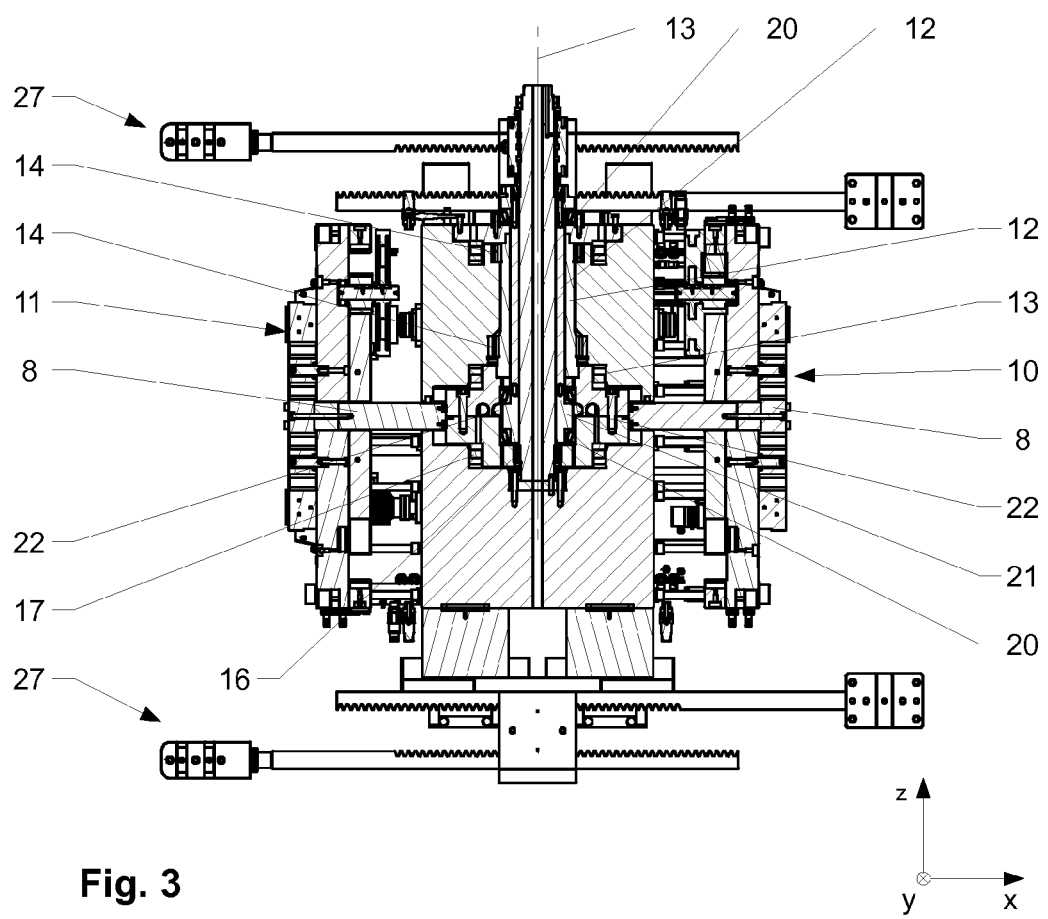
FIG. 3 shows a sectional view along the sectional line AA according to FIG. 2.

The third mold half has a top part 5 and a bottom part 6, which are arranged spaced apart from each other by a slot 7. In the slot 7, four arms 8 arranged in a star shape can be seen, which have one or more carriers 9 at the outer ends thereof, by means of which one or more injection molding parts (not shown in detail) can be transported from first cavities 10 in the region of the first lateral surface 3 into second cavities 11 in the region of the second parting plane. The carriers 9 are arranged to be adjustable in the radial direction. To this end, the arms 8 have a length that is adjustable in the radial direction. As can be seen from FIG. 3, the arms 8 are operatively connected on the inside with the first drive shaft 12, or are hold thereby, respectively. The drive shaft 12 is mounted so as to be rotatable about a rotary axis 13.

In the embodiment shown, the drive shaft 12 is mounted by first and second bearings 14, 15 in the radial direction and the axial direction relative to the top part 5, and by third and fourth bearings 16, 17 in the radial and the axial direction relative to the bottom part 6. In principle, the first drive shaft 12 constitutes the only mechanical connection between the top part 5 and the bottom part 6, which substantially centers the two parts relative to each other. The first drive shaft 12 is formed as a stub in the bottom part 6. In the top part, the drive shaft 12 extends to the top end of the top part 5, where it is operatively connected to a first motor 18.

The first drive shaft 12 is designed to be hollow and has a second drive shaft 19 on the inside thereof, which is arranged coaxially to the first drive shaft 12 and is mounted so as to be rotatable relative to the latter by means of fifth bearings 20. The second drive shaft is operatively connected to toothed racks 22 of the arms 8 via a pinion 21 and serves for the simultaneous adjustment of the radial lengths of the arms 8 relative to the rotary axis 13. The second drive shaft is operatively connected to a second motor 23. For transporting parts produced in the first parting plane, the injection molding device is opened along the first and second parting planes, subsequently the second motor 23 becomes active and effects a radially outward movement of the carriers 9 fastened to the arms 8 via the second drive shaft 19. Subsequently, the first motor 18 becomes active and rotates the first drive shaft 12 about the rotary axis 13. As a result, parts (not shown) produced in the first cavities 10 of the first parting plane are pivoted about the top part 5 or the bottom part 6, respectively, and are moved, in the second parting plane, into a position above the second cavities 11. After that, the second motor 23 becomes active again and effects, by driving the second drive shaft 19, an inward movement of the carriers 9 again with the racks 22 operatively connected to the pinion 21 and a lowering of the parts from the first parting plane into the second cavities 11 of the second parting plane, where they are subjected, upon closing of the injection molding device 2, to a further processing operation.

The top part 5 is supported, by means of first linear guides 24, on the top two tie bars of an injection molding machine so as to be displaceable in the first direction (neither of them shown in detail). The bottom part 6 is supported, via second linear guides 25, on the machine bed of the injection molding machine (neither of them shown in detail) and/or on the two bottom tie bars of the injection molding machine so as to be displaceable in the first direction.

If required, the first and/or second cavities 10, 11 have jaws 26 that are laterally displaceable in the first or the second lateral surface 3, 4, which jaws form mold cavities on the inside thereof, into which plasticized material is injected. The jaws 26 allow the production of very complex parts with large undercuts.

The invention claimed is:

1. An injection molding device comprising:
   a. a first mold half and a second mold half which are arranged to be linearly displaceable relative to the first mold half in the first direction;
   b. a third mold half arranged between the first and second mold halves, which interacts with the first mold half in a region of a first parting plane in order to form first cavities and with the second mold half in the region of a second parting plane in order to form second cavities,
   c. the third mold half includes a top part and a bottom part which are spaced from each other by a slot;
   d. at least one carrier for an injection-molded part arranged on the drive shaft so as to be displaceable in the radial direction via an arm;
   e. a first drive shaft arranged on the inside of the third mold half;
   and
   f. at least one bearing supports the first drive shaft relative to the top part and relative to the bottom part and centers the bottom part relative to the top part via the first drive shaft.

2. The injection molding device as claimed in claim 1, wherein the first drive shaft constitutes, via the at least one hearing, the only direct mechanical connection between the top part and the bottom part.

3. The injection molding device as claimed in claim 1, wherein the first drive shaft is hollow and includes on the inside a second drive shaft, which drives the at least one carrier in the radial direction.

4. The injection molding device as claimed in claim 3, wherein the second drive shaft is hollow.

5. The injection molding device as claimed in claim 1, wherein the first and/or the second drive shaft serve for transferring media.

6. The injection molding device as claimed in claim 1, wherein the first drive shaft is operatively connected to a first motor that is fastened to the top part.

7. The injection molding device as claimed in claim 3, wherein the second drive shaft is operatively connected to a second motor that is arranged in the region of a first end of the first drive shaft.

8. The injection molding device as claimed in claim 1, wherein the top part includes first linear guides supporting the top part on tie bars of an injection molding machine.

9. The injection molding device as claimed in claim 1, wherein the bottom part includes second linear guides that are suitable for supporting the bottom part on a machine bed and/or on spars of an injection molding machine.

10. The injection molding device as claimed in claim 1, wherein the cavities have, in at least one parting plane, jaws that are displaceable in a lateral direction.

* * * * *